C. JILLSON.
LATHE ATTACHMENT FOR TURNING TAPERS ON BARS.
No. 43,311. Patented June 28, 1864.
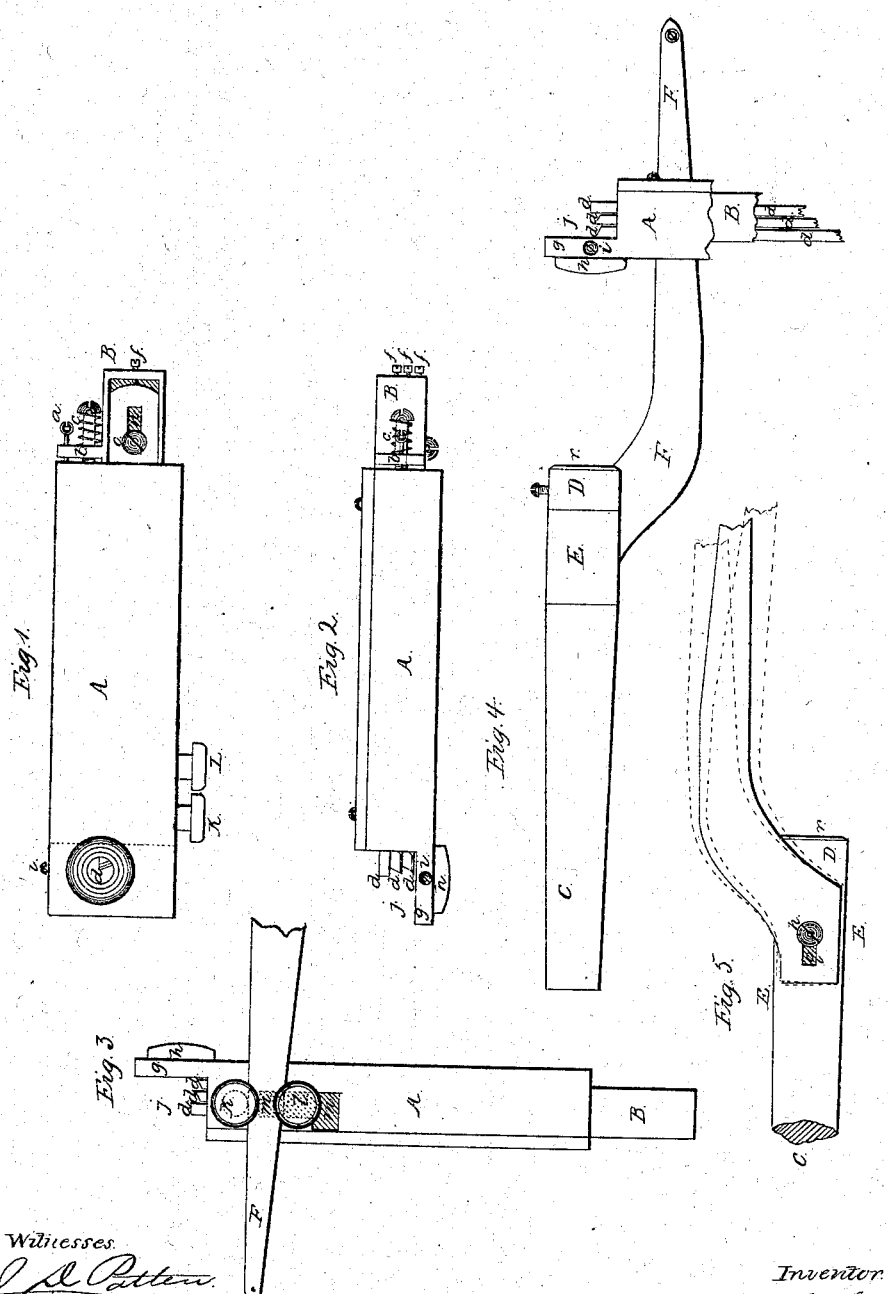

UNITED STATES PATENT OFFICE.

C. JILLSON, OF WORCESTER, MASSACHUSETTS.

IMPROVED LATHE ATTACHMENT FOR TURNING TAPERS ON BARS.

Specification forming part of Letters Patent No. 43,311, dated June 28, 1864.

*To all whom it may concern:*

Be it known that I, C. JILLSON, of Worcester, in the county of Worcester and State of Massachusetts, have invented certain new and useful improvements in lathe attachments for turning long tapers upon metal rods, bars, or any other substance from which tapers are or may be cut; and I do hereby declare that the following is a full, clear, and exact description of the same, reference being had to the accompanying drawings, making a part of this specification, in which—

Figure 1 represents a side view of the tool-stock and cutting-tools therein, and their mode of operation. Fig. 2 represents an edge view of the same. Fig. 3 represents a view of the under side of the tool-stock, with a portion of the pattern in working position. Fig. 4 represents a view of the pattern attached to the shank that goes into the live-spindle of the lathe. Fig. 5 represents the manner of connecting the pattern to the shank so as to adjust it for various tapers.

Similar letters of reference, where they occur in the several separate figures, denote like parts of the contrivance in all the drawings.

The object of my invention is to provide certain contrivances for turning or cutting long tapers which may be used in an ordinary lathe, and without providing a lathe specially for such purpose, as heretofore done, these contrivances being susceptible of a ready attachmement to or detachment from a lathe, without any change or alteration of the lathe itself.

To enable others skilled in the art to make and use my invention, I will proceed to describe the same with reference to the drawings.

The tool-stock A contains within itself a tool-holder, B, which can be adjusted forward or back therein by means of a set-screw, *a*, passing through the projection *b* on the tool-holder, and bearing against the tool-stock A, and a spring, *c*, for holding the tool-holder and its cutters *d* up to the work, as shown. The cutters *d* lie in the tool holder, and are set up, as they are worn away, or as it may be necessary to so arrange them that one shall cut in advance of the other, by the set-screws *f*, there being a set-screw to each cutter, whatever their number may be, for this purpose. A projection, *g*, is made on the stock A, in which a series of eyes or guides, *h*, may be used, the openings through which may be of varying diameters, so as to take in rods or pieces of varying sizes, and these eyes or guides are secured in place by set-screws *i*, or in any other well-known manner of holding detachable and removable pieces. In the recess *j*, formed by the projection *g*, the points of the cutters or chisels *d* protrude so as to act upon the thing or material that is to be cut in a tapering form. On the under side (for convenience only, as they may be elsewhere) of the stock A are two buttons, *k l*, the one, *k*, being fastened to the stock A and immovable, and the other one, *l*, being fastened to the tool or chisel holder B, and movable by means of the slot *m* in the stock when the pattern or guide acts upon it, as will be explained hereinafter.

From the above description it will be understood that the chisels or cutters *d* are adjustable in their holder A, and may be adjusted at any time therein by means of the set-screws *f*. The chisels may, moreover, be slotted, as at *n*, and a holding-screw, *o*, pass through said slots into the holder A, to give them further rigidity or steadiness, and that the chisels may be so placed as to work in advance of each other upon the article being shaped or cut by them, each succeeding chisel cutting deeper than the preceding one; and that the chisel-holder B is adjustable in the stock A at any time, so that the cutters are separately and unitedly adjustable in the stock, as may be required. The shank C is made to fit into the live-spindle of any common lathe, so as to rotate with said live-spindle. It has a collar, D, on its end, which, when in position, is held permanently to the shank C. Behind this collar D there is a head-stock, E, on the spindle or shank C, and so united thereto that the shank may freely turn with the live-spindle of the lathe while the head-stock E remains motionless. To this head-stock E there is attached by a set-screw and slot, *p q*, an arm or pattern, F, that defines the taper of the article that is to be cut, and may be changed for another of different length or shape, or adjusted both longitudinally and laterally, as may be desired.

The operation of this attachment is as follows: The stock A is fastened to the slide-rest or tool-holder of any ordinary lathe. The shank C is inserted in the live-spindle of the lathe. The article to be cut or turned to a taper is put into the end r of the shank C. The stock A is now moved up until the end of the article to be cut enters the eye h, and the point of the arm or pattern F passes between the buttons k l, as seen in Fig. 3. The lathe being now set in motion, the stock and the chisels are fed up by the slide-rest or tool-holder, and as it moves up toward the spindle the arm or pattern F, pressing against the button l, moves it and the series of cutters away from the thing being cut, just in proportion to its taper, which may, as before stated, be varied; or, instead of working from the point of the taper toward its base, the reverse may be done—viz , begin at the base and work to the point. The moving of the cutters toward or from the axis of the shank or spindle by a defined pattern or arm, as they are moved along the article to be cut, gives a defined taper, as herein described.

Instead of making the shank and spindle as above described, the shank may be made hollow and go on over the spindle; or any other ordinary lathe attachment may be used.

Having thus fully described my invention, what I claim therein as new, and desire to secure by Letters Patent, is—

1. The combination of the stock A, tool-holder B, eye h, and cutters or chisels d, operating together, as and for the purpose described.

2. In combination with the stock and with the tool-holder, the buttons k l, for allowing the latter to be moved in the former by a gage or pattern, substantially as described.

3. In combination with a revolving shank or spindle, a head-stock attached thereto, but not turning with it, and a pattern or guide upon said head-stock, for the purpose of controlling the chisels or cutters and defining their working distance from the center of the article being tapered, substantially as described.

C. JILLSON.

Witnesses:
WM. N. GREEN,
HENRY COLE.